United States Patent
Ling et al.

(10) Patent No.: US 9,438,460 B2
(45) Date of Patent: Sep. 6, 2016

(54) PARTIAL DISCRETE FOURIER TRANSFORM-SPREAD IN AN ORTHOGONAL FREQUENCY DIVISION MULTIPLEXING SYSTEM

(71) Applicant: FINISAR CORPORATION, Sunnyvale, CA (US)

(72) Inventors: William Ling, Santa Clara, CA (US); Ilya Lyubomirsky, Pleasanton, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/885,264

(22) Filed: Oct. 16, 2015

(65) Prior Publication Data

US 2016/0112238 A1   Apr. 21, 2016

Related U.S. Application Data

(60) Provisional application No. 62/065,332, filed on Oct. 17, 2014.

(51) Int. Cl.
*H04L 5/12* (2006.01)
*H04L 27/34* (2006.01)
*H04L 27/36* (2006.01)

(52) U.S. Cl.
CPC ......... *H04L 27/3411* (2013.01); *H04L 27/362* (2013.01)

(58) Field of Classification Search
CPC .............. H04L 5/0007; H04L 2025/03414; H04L 27/2636; H04L 5/0094; H04L 27/34; H04L 27/36; H04L 27/2633; H04W 16/10; H04B 7/204

USPC ............... 370/210; 375/295, 260, 261, 298; 708/405; 332/103
See application file for complete search history.

(56) References Cited

U.S. PATENT DOCUMENTS

2013/0195459 A1* 8/2013 Shieh ................. H04B 10/2507
                                                                      398/79

OTHER PUBLICATIONS

J. D'Ambrosia, "The 400 GbE project ahead," in IEEE 802.3 400 Gb/s Ethernet Study Group, Interim Meeting, Victoria, Canada, 2013 (12 pages).

C. Cole, "Future datacenter interfaces based on existing and emerging optics technologies," in IEEE Photonics Summer Topicals, Waikoloa, USA, 2013 (29 pages).

(Continued)

*Primary Examiner* — Rahel Guarino
(74) *Attorney, Agent, or Firm* — Maschoff Brennan

(57) ABSTRACT

A method of transmitting data may include converting a stream of serial data bits into a set of parallel quadrature amplitude modulation (QAM) symbols. The method may additionally include applying a partial discrete Fourier transform-spread technique to transform a block of low-frequency subcarriers into a single-carrier QAM signal. The single-carrier QAM signal may bear information of a first subset of QAM symbols from the set of parallel QAM symbols. The method may additionally include transforming one or more remaining QAM symbols to form one or more subcarriers. Each of the one or more subcarriers may bear information of a corresponding QAM symbol from the one or more remaining QAM symbols. The method may additionally include generating a hybrid signal that includes the single-carrier QAM signal and the one or more subcarriers. The method may additionally include transmitting the hybrid signal.

23 Claims, 7 Drawing Sheets

(56) References Cited

OTHER PUBLICATIONS

D. M. Kuchta, A. V. Rylyakov, C. L. Schow, J. E. Proesel, C. Baks, C. Kocot, L. Graham, R. Johnson, G. Landry, E. Shaw, A. MacInnes, and J. Tatum, "55Gb/s directly modulated 850nm VCSEL-based optical link," in IEEE Photonics Conference, 2012, p. PD 1.5 (2 pages).
I.-C. Lu, C.-C. Wei, J.-W. Shi, H.-Y. Chen, S.-F. Tsai, Z.-R. Wei, J.-M. Wun, J.-X. Wu, and J. Chen, "A 64.4 Gbps-km optical interconnect employing a high-power high-speed single-mode 850-nm VCSELs and OFDM format," in Proc. Eur. Conf. Opt. Commun., 2013, pp. 837-839 (3 pages).
J. Armstrong, "OFDM for optical communications," J. Lightw. Technol., vol. 27, No. 3, pp. 189-204, Feb. 2009 (16 pages).
J. Campello, "Practical bit loading for DMT," in Proc. Global Telecom-mun. Conf. (GLOBECOM '99), Vancouver, Canada, 1999, pp. 801-805 (5 pages).
I. Lyubomirsky, W. A. Ling, R. Rodes, H. M. Daghighian, and C. Kocot, "56 Gb/s transmission over 100m OM3 using 25G-class VCSEL and discrete multi-tone modulation," in Optical Interconnects Conference 2014, 2014. (7 pages).
H. G. Myung, J. Lim, and D. J. Goodman, "Peak-to-average power ratio of single carrier FDMA signals with pulse shaping," in The 17th Annual IEEE International Symposium on Personal, Indoor and Mobile Radio Communications, 2006 (5 pages).
G. Shulkind and M. Nazarathy, "An analytical study of the improved nonlinear tolerance of DFT-spread OFDM and its unitary-spread OFDM generalization," Opt. Express, vol. 20, No. 23, pp. 25 884-25 901, 2012 (18 Pages).
R. Schmogrow, P. Schindler, C. Koos, W. Freude, and J. Leuthold, "Pulse-shaping for spectrally efficient coherent optical networks: OFDM, Nyquist signaling, and DFT-spread OFDM," in Proceedings of SPIE 2014, 2014, pp. 1-14. (14 pages).
J. D'Ambrosia, "The 400GbE project: An overview," in IEEE P802.3bs 400GbE Task Force, Interim Meeting (Norfolk, VA, 2014) (8 pages).
J. Lee, N. Kaneda, T. Pfau, A. Konczykowska, F. Jorge, J.-Y. Dupuy, and Y.-K. Chen, "Serial 103.125-Gb/s transmission over 1 km SSMF for low-cost, short-reach optical interconnects," in Proc. Optical Fiber Commun. Conf. (2014), paper Th5A.5. (3 pages).
M. I. Olmedo, T. J. Zuo, J. B. Jensen, Q. W. Zhong, X. G. Xu, and I. T. Monroy, "Towards 400GBASE 4-lane solution using direct detection of MultiCAP signal in 14 GHz bandwidth per lane," in Proc. Optical Fiber Commun. Conf. (2013), paper PDP5C.10. (3 pages).
M. Chagnon, M. Osman, M. Poulin, C. Latrasse, J. F. Gagne, Y. Painchaud, C. Paquet, S. Lessard, and D. Plant, "Experimental study of 112 Gb/s short reach transmission employing PAM formats and SiP intensity modulator at 1.3 μm," Opt. Express 22, 21018-21036 (2014) (19 pages).
T. Tanaka, M. Nishihara, T. Takahara, W. Yan, L. Li, Z. Tao, M. Matsuda, K. Takabayashi, and J. C. Rasmussen, "Experimental demonstration of 448-Gbps+ DMT transmission over 30-km SMF," in Proc. Optical Fiber Commun. Conf. (2014), paper M21.5. (3 pages).
L. F. Suhr, J. J. V. Olmos, B. Mao, X. Xu, G. N. Liu, and I. T. Monroy, "112-Gbit/s x 4-lane duobinary-4-PAM for 400GBase," in Proc. Eur. Conf. Opt. Commun. (2014), paper Tu.4.32. (3 pages).
K. P. Zhong, X. Zhou, T. Gui, L. Tao, Y. L. Gao, W. Chen, J. W. Man, L. Zeng, A. P. T. Lau, and C. Lu, "Experimental study of PAM-4, CAP-16, and DMT for 100 Gb/s short reach optical transmission systems," Opt. Express 23, 1176-1189 (2015). (14 pages).
M. Vitic, D. Lewis, and S. Corbeil, "2 km SMF 400 Gb/s live traffic results using DMT test chips," in IEEE P802.3bs 400GbE Task Force, Interim Meeting (Atlanta, GA, 2015) (15 pages).
N. Kikuchi, R. Hirai, and T. Fukui, "Practical implementation of 100-Gbit/s/lambda optical short-reach transceiver with Nyquist PAM4 signaling using electroabsorptive modulated laser (EML)," in Proc. Optical Fiber Commun. Conf. (2015), paper Th3A.2 (3 pages).
P. Kolesar, "Loss budgeting for 400GE channels," in IEEE P802.3bs 400GbE Task Force, Interim Meeting (Norfolk, VA, 2014). (15 pages).
M. Gustlin, M. Langhammer, D. Ofelt, and Z. F. Wang, "Investigation on technical feasibility of stronger RS FEC for 400GbE," in IEEE P802.3bs 400GbE Task Force, Interim Meeting (Atlanta, GA, 2015) (19 pages).
S. C. J. Lee, S. Randal, F. Breyer, and A. M. J. Koonen, "PAM-DMT for intensity-modulated and direct-detection optical communication systems," IEEE Photon. Technol. Lett. 21, 1749-1751 (2009) (3 pages).
J. Armstrong, "OFDM for optical communications," J. Lightw. Technol. 27,189-204 (2009) (16 pages).
W. A. Ling, I. Lyubomirsky, R. Rodes, H. M. Daghighian, and C. Kocot, "Single-channel 50G and 100G discrete multitone transmission with 25G VCSEL technology," J. Lightw. Technol. 33,761-767 (2015). (7 pages).
D. Fraser, "Interpolation by the FFT revisited—an experimental investigation," IEEE Trans. Acoust., Speech, Signal Process. 37, 665-675 (1989) (11 pages).
E. Vanin, "Performance evaluation of intensity modulated optical OFDM system with digital baseband distortion," Opt. Express 19, 4280-4293 (2011) (14 pages).
Y. Matsui, T. Pham, T. Sudo, G. Carey, and B. Young, "112-Gb/s WDM link using two directly modulated Al-MQW BH DFB lasers at 56 Gb/s," in Proc. Optical Fiber Commun. Conf. (2015), paper Th5B.6.(3 pages).
S. Randel, S. Corteselli, P. J. Winzer, A. Adamiecki, A. Gnauck, S. Chandrasekhar, A. Bielik, L. Altenhain, T. Ellermeyer, U. Dumler, H. Langenhagen, and R. Schmid, "Generation of a digitally shaped 55-GBd 64-QAM single-carrier signal using novel high-speed DACs," in Proc. Optical Fiber Commun. Conf. (2014), paper M2A.3 (3 pages).
J.Wang and K. Petermann, "Small signal analysis for dispersive optical fiber communication systems," J. Lightw. Technol. 10, 96-100 (1992). (5 pages).

\* cited by examiner

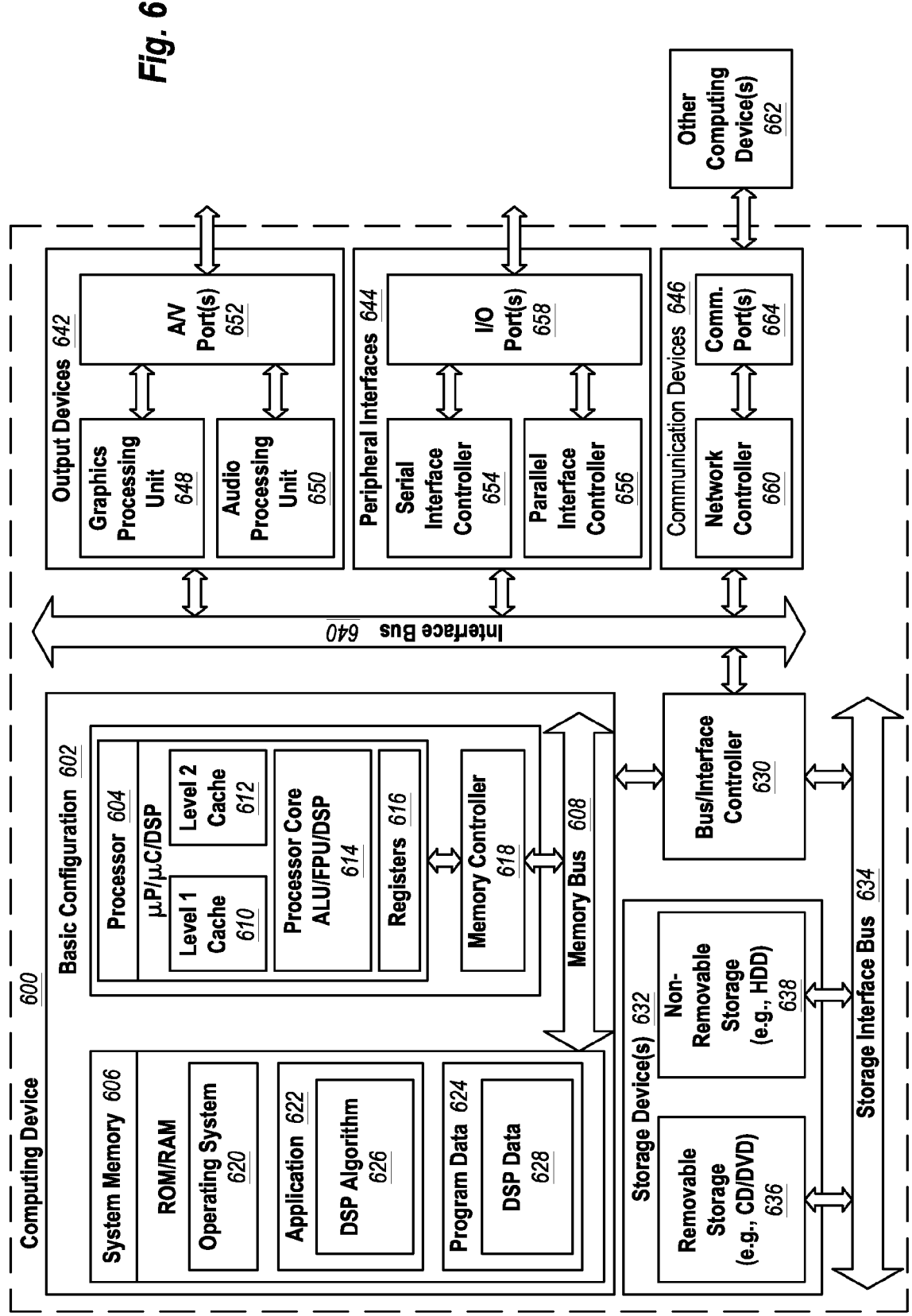

PARTIAL DISCRETE FOURIER TRANSFORM-SPREAD IN AN ORTHOGONAL FREQUENCY DIVISION MULTIPLEXING SYSTEM

CROSS-REFERENCE TO RELATED APPLICATION

This application claims the benefit of and priority to U.S. Provisional Application No. 62/065,332, filed Oct. 17, 2014, which application is incorporated herein by reference.

FIELD

Some embodiments described herein generally relate to digital signal processing (DSP) in an orthogonal frequency division multiplexing (OFDM) system.

BACKGROUND

Unless otherwise indicated herein, the materials described herein are not prior art to the claims in the present application and are not admitted to be prior art by inclusion in this section.

Optical discrete multitone (DMT) has become a candidate for next-generation short-reach and metropolitan area network fiber optic links. Due to its use of subcarriers, DMT may effectively equalize channel distortion with low computational complexity and limited noise enhancement. DMT may also have controllable information density across frequency, which allows efficient use of information capacity of channels with non-uniform magnitude. However, DMT may suffer from large peak-to-average-power ratio (PAPR), which may result in a need for a wider dynamic range in electronics that may include, but are not limited to, a digital-to-analog converter (DAC), an analog-to-digital converter (ADC), and a modulator. This may be problematic for intensity-modulated direct-detection (IM-DD) DMT, since the high optical bias may also result in more shot noise and a larger relative intensity noise (RIN) penalty.

Quadrature amplitude modulation (QAM) techniques may include transmitting a sinusoid modulated in amplitude and phase by a sequence of complex symbols. The QAM techniques may have low PAPR compared to DMT. However, the QAM techniques may suffer noise enhancement from channels with large magnitude variations in frequency.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to digital signal processing in an OFDM system.

In an example embodiment, a method of transmitting data is described. The method may include converting a first stream of serial data bits into a set of parallel QAM symbols. The method may additionally include applying a partial discrete Fourier transform-spread (DFT-S) technique to transform a block of low-frequency subcarriers into a single-carrier QAM signal. The single-carrier QAM signal may bear information of a first subset of QAM symbols from the set of parallel QAM symbols. The method may additionally include transforming one or more remaining QAM symbols from the set of parallel QAM symbols to form one or more subcarriers. Each of the one or more subcarriers may bear information of a corresponding QAM symbol from the one or more remaining QAM symbols. The method may additionally include generating a hybrid signal that includes the single-carrier QAM signal and the one or more subcarriers. The method may additionally include transmitting the hybrid signal.

In another example embodiment, a partial DFT-S DMT system is described. The partial DFT-S DMT system may include a serial-to-parallel QAM module configured to receive a first stream of serial data bits and convert the first stream of serial data bits into a set of parallel QAM symbols. The partial DFT-S DMT system may additionally include a partial DFT-S module communicatively coupled to the serial-to-parallel QAM module. The partial DFT-S module may be configured to apply a partial DFT-S technique to transform a block of low-frequency subcarriers into a single-carrier QAM signal. The single-carrier QAM signal may bear information of a first subset of QAM symbols from the set of parallel QAM symbols. The partial DFT-S module may include a discrete Fourier transform (DFT) module and an inverse discrete Fourier transform (IDFT) module. The IDFT module may be configured to transform one or more remaining QAM symbols from the set of parallel QAM symbols to form one or more subcarriers. Each of the one or more subcarriers may bear information of a corresponding QAM symbol from the one or more remaining QAM symbols. The IDFT module may be configured to generate a hybrid signal that includes the single-carrier QAM signal and the one or more subcarriers. The hybrid signal may be configured to transmit to a receiver.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 is a block diagram that illustrates an example computing device that is arranged for implementing digital signal processing in an OFDM system.

DETAILED DESCRIPTION OF SOME EXAMPLE EMBODIMENTS

Figure 1:
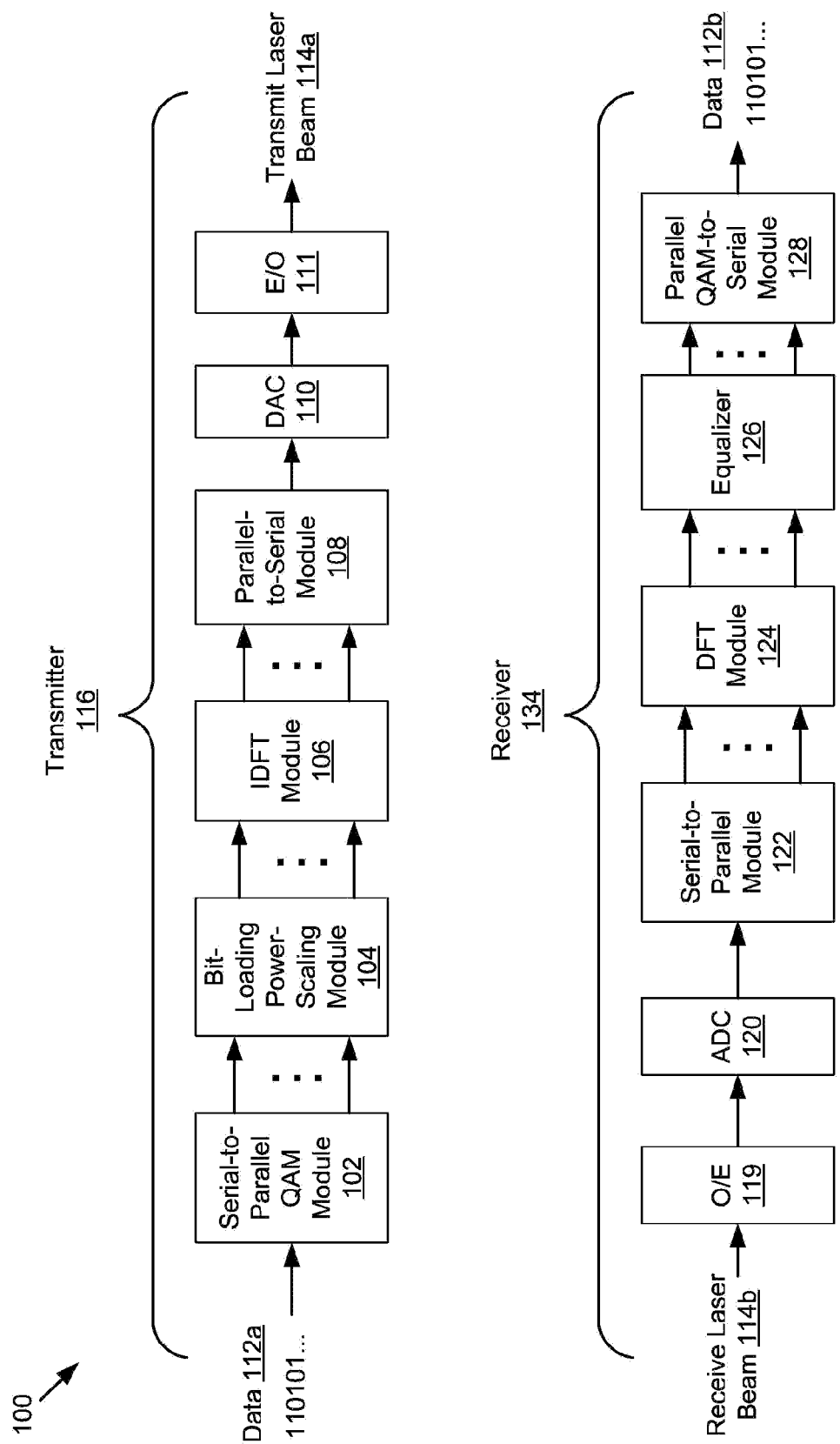
FIG. 1 is a block diagram of an example structure of a DMT system.

Embodiments described herein generally relate to digital signal processing in an OFDM system.

An example implementation of an OFDM system may include a DMT system. For example, a DMT system may represent a real-valued form of an OFDM system. Throughout the disclosure, description provided herein may refer to a DMT system; however, the description may generally be applicable to an OFDM system with in-phase and quadrature (I-Q) E-field modulation rather than intensity modulation.

Some embodiments described herein may allow combining DMT and QAM with a partial DFT-S technique and/or combining DMT and pulse amplitude modulation (PAM). The partial DFT-S technique in an OFDM system may be referred to as single-carrier frequency division multiple access, which may be a modified OFDM technique configured to lower the PAPR of an OFDM signal by combining one or more groups of subcarriers into one or more single-carrier signals, respectively. The partial DFT-S technique may include using discrete Fourier transform (DFT) and inverse discrete Fourier transform (IDFT) to convert a low-frequency band into a single-carrier QAM signal with low computational complexity. The low-frequency band may include a block of low-frequency subcarriers that may also be referred to as a DFT-S block. The DFT output may be digitally pre-equalized using real-valued scaling before performing the IDFT to reduce noise enhancement that may result from zero-forcing equalization at a receiver.

A hybrid signal may be generated as an output from the IDFT and may include the single-carrier QAM signal and a high-frequency DMT signal. The single-carrier QAM signal may bear information of a first subset of QAM symbols from a set of parallel QAM symbols. The high-frequency DMT signal may include remaining subcarriers from the DMT. Each remaining subcarrier may have a frequency higher than the low-frequency subcarriers in the DFT-S block and may bear information of a corresponding remaining QAM symbol from the set of parallel QAM symbols. The single-carrier QAM signal may be orthogonal to the remaining subcarriers in the high-frequency DMT signal, which indicates no interference between the single-carrier QAM signal and the high-frequency DMT signal.

The PAPR of the hybrid signal may be lower than that of a pure DMT signal since the single-carrier QAM signal in the hybrid signal accounts for most of the transmitted signal power. While the pure DMT signal may include subcarriers from the entire DMT band, the high-frequency DMT signal may include subcarriers in a high-frequency DMT band with no subcarriers (or, zeroed subcarriers) in the low-frequency DMT band. Additionally, the hybrid signal may incur less noise enhancement at the receiver side compared to a pure QAM signal since the hybrid signal includes DMT subcarriers in the high-frequency DMT band. While the pure QAM signal may occupy the entire signal band, the single-carrier QAM signal in the hybrid signal may merely occupy the low-frequency band.

As described herein, the partial DFT-S technique may transmit a QAM signal in a low-frequency band where QAM transmission outperforms DMT transmission and may transmit DMT subcarriers in a high-frequency band where the DMT transmission outperforms the QAM transmission. The performance of the partial DFT-S technique may be lower-bounded by the pure QAM and/or DMT and may exceed performance of the pure QAM and/or DMT when the channel includes both a flat low-frequency band and a non-uniform high-frequency band. Directly-modulated lasers may exhibit such a channel characteristic with both a flat low-frequency band and a non-uniform high-frequency band.

The partial DFT-S technique described herein does not apply DFT spreading to an entire set of subcarriers in the DMT system. Instead, the partial DFT-S technique may apply DFT spreading to a single block of low-frequency subcarriers where the magnitude of the channel transfer function is relatively flat compared to the high-frequency band. Alternatively or additionally, the partial DFT-S technique may apply DFT spreading to transform multiple blocks of subcarriers into multiple single-carrier QAM signals with varying constellation sizes, respectively.

A partial DFT-S DMT system described herein may implement the partial DFT-S technique. The partial DFT-S DMT system may be a hybrid between pure QAM and DMT systems and may outperform the pure QAM and/or DMT systems.

A conventional 25 G distributed feedback laser (DFB) may be capable of transmitting at a data rate of 112 gigabits per second (Gb/s) using a pure DMT. The data rate of 112 Gb/s may include a useful data rate of 100 Gb/s plus a forward error correction (FEC) overhead of 12 Gb/s. A reduced-RN 25 G vertical-cavity surface-emitting laser (VCSEL) may fail to achieve the data rate of 112 Gb/s with a bit error rate (BER) of $10^{-3}$ using the pure DMT. The 25 G VCSEL may have a RIN of $-145$ dB/Hz. However, the partial DFT-S technique described herein may help the reduced-RN 25 G VCSEL to reach the data rate of 112 Gb/s with the BER of $10^{-3}$ without increasing a bandwidth of the VCSEL. For a directly modulated DFB, the partial DFT-S technique may result in at least 2 dB more sensitivity than pure DMT.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 is a block diagram of an example structure of a DMT system 100, arranged in accordance with at least some embodiments described herein. The example DMT system 100 illustrated in FIG. 1 includes a transmitter 116 and a receiver 134. The transmitter 116 may transmit data to the receiver 134 over an optical fiber channel (not shown in FIG. 1). The transmitter 116 may include a serial-to-parallel QAM module 102, a bit-loading power-scaling module 104, an IDFT module 106, a parallel-to-serial module 108, a DAC 110, an electro-optical converter (E/O) 111, and any other suitable components in a transmitter of a DMT system. More generally, the transmitter 116 may include other modules, components, and/or devices not shown in FIG. 1.

The DMT system 100 may transmit data over multiple harmonically-related subcarriers. In some embodiments, the serial-to-parallel QAM module 102 may receive data 102a (e.g., a stream of serial data bits such as 110101 . . . ) from a data source. The serial-to-parallel QAM module 102 may convert the stream of serial data bits into parallel streams of data bits (e.g., P parallel streams of data bits with P≤N, where the symbol "N" may represent a number of subcarriers that each may be used to transmit data to the receiver 134). For a particular parallel stream of data bits, the serial-to-parallel QAM module 102 may modulate corresponding data bits in the particular parallel stream using a corresponding QAM modulation technique and may output a corresponding QAM symbol. As a result, the serial-to-parallel QAM module 102 may output a set of QAM symbols in parallel (e.g., P parallel QAM symbols). Example QAM modulation techniques may include, but are not limited to, QAM, 4-QAM, 8-QAM, 16-QAM, and any other suitable QAM techniques.

In some embodiments, data to be transmitted through the DMT system may be unequally allocated across frequency since different channels or subcarriers associated with different frequencies may have varied signal-to-noise ratios (SNRs). For example, a first channel with a higher SNR may be allocated with more bits per second to transmit than a second channel with a lower SNR. If a SNR of a particular channel is lower than a threshold, the particular channel may not be used to transmit any data. As a result, the bit-loading power-scaling module 104 may load different number of bits to each subcarrier per transmission and may scale a corresponding transmission power level for each subcarrier. For example, the bit-loading power-scaling module 104 may use loading algorithms to determine a number of bits loaded to each subcarrier and a power level distributed to each subcarrier. An example loading algorithm may include a discrete-bit-allocation algorithm. Other example loading algorithms may also be implemented herein.

In some embodiments, the bit-loading power-scaling module 104 may cooperate with or be integrated into the serial-to-parallel QAM module 102. The serial-to-parallel QAM module 102 and/or the bit-loading power-scaling module 104 may use different QAM constellations to transform the parallel streams of data bits into QAM symbols, respectively. For example, assume that a first parallel stream of data bits may be transmitted using a first channel (e.g., a first subcarrier) and a second parallel stream of data bits may be transmitted using a second channel (e.g., a second subcarrier). The first channel has an SNR higher than that of the second channel. A 32-QAM constellation may be used to transform the first parallel stream of data bits into QAM symbols, so that a corresponding QAM symbol from the 32-QAM constellation may be generated for every 5 bits in the first parallel stream. A 16-QAM constellation may be used to transform the second parallel stream of data bits into QAM symbols, so that a corresponding QAM symbol from the 16-QAM constellation may be generated for every 4 bits in the second parallel stream. As a result, the bit-loading power-scaling module 104 may generate a set of parallel QAM symbols (e.g., P parallel QAM symbols) and may send the set of parallel QAM symbols to the IDFT module 106.

The IDFT module 106 may perform an inverse discrete Fourier transform (e.g., an inverse fast Fourier transform) on the set of parallel QAM symbols received from the bit-loading power-scaling module 104. The IDFT module 106 may generate an IDFT output that includes multiple subcarriers (e.g., N DMT subcarriers) with each subcarrier bearing information of a corresponding QAM symbol. In some embodiments, to force an output of the IDFT module 106 to be real, a first half of the inputs to the IDFT module 106 may hold unique QAM data while the other half of the inputs to the IDFT module 106 may be formed by reverse-ordering and conjugating the first half of the inputs. This may be referred to as a Hermitian symmetry property of the IDFT module 106.

The parallel-to-serial module 108 may convert an output of the IDFT module 106 to a serial stream. The parallel-to-serial module 108 may add a cyclic prefix to the serial stream to eliminate inter-symbol interference (ISI) between blocks and to convert linear convolution into circular convolution.

The DAC 110 may convert a digital waveform formed by the serial stream outputted from the parallel-to-serial module 108 to an analog signal. The E/O 111 may generate a transmit laser beam 114a according to the analog signal and may emit the transmit laser beam 114a to an optical fiber channel. For example, the E/O 111 may include a VCSEL or other suitable laser that may generate the transmit laser beam 114a according to the analog signal. The VCSEL may emit the transmit laser beam 114a to the optical fiber channel so that the transmit laser beam 114a may propagate to the receiver 134 via the optical fiber channel.

The receiver 134 may include an opto-electrical converter (O/E) 119, a ADC 120, a serial-to-parallel module 122, a DFT module 124, an equalizer 126, a parallel QAM-to-serial module 128, and any other suitable components for a receiver. More generally, the receiver 134 may include other modules, components, or devices not shown in FIG. 1. In some embodiments, the receiver 134 may perform inverse operations of the transmitter 116. Additionally, the receiver 134 may perform equalization using the equalizer 126 implemented in the frequency domain by applying a scaling to the outputs of the DFT module 124.

In some embodiments, the O/E 119 may include a photodiode or other optical receiver. Optionally, the O/E 119 may additionally include a transimpedance amplifier or other amplifier circuitry. The O/E 119 may receive a receive laser beam 114b from the optical fiber channel. The receive laser beam 114b may include the transmit laser beam 114a corrupted by noise and/or loss during the propagation process through the optical fiber channel. The O/E 119 may convert the receive laser beam 114b into an analog signal and may optionally amplify the analog signal. The ADC 120 may convert the analog signal to a digital signal that includes a serial bit stream. The serial-to-parallel module 122 may remove the cyclic prefix from the serial bit stream. The serial-to-parallel module 122 may additionally split the serial bit stream into multiple parallel data streams. The DFT module 124 may perform a discrete Fourier transform (e.g., a fast Fourier transform) on the multiple parallel data streams. The equalizer 126 may equalize the multiple parallel data streams outputted from the DFT module 124. The equalizer 126 may include a zero-forcing single-tap equalizer or another suitable equalizer. The parallel QAM-to-serial module 128 may demodulate each of the multiple data streams using a corresponding QAM demodulation technique and may output data 112b (e.g., a stream of serial data bits such as 110101 . . . ).

Figure 2A:
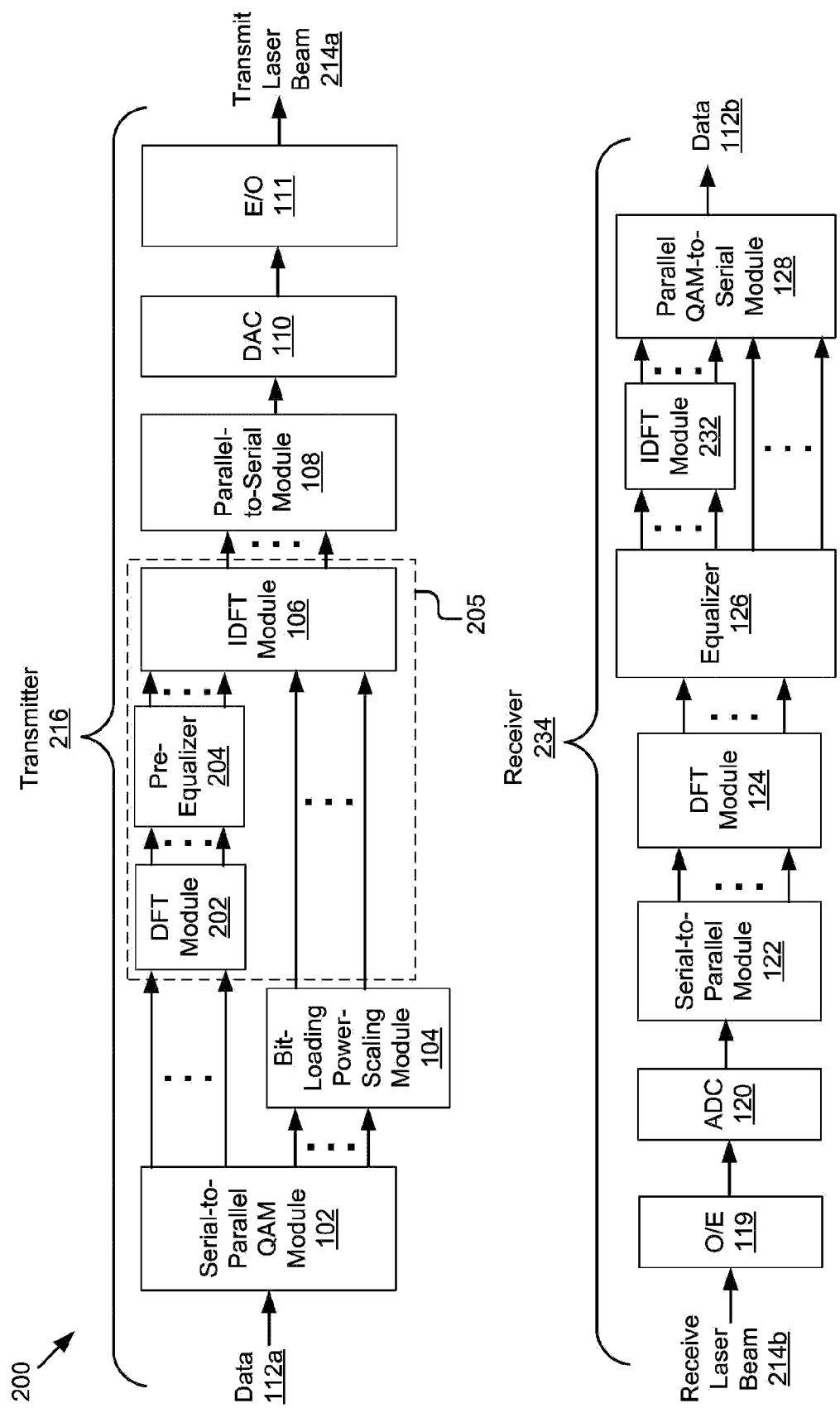
FIG. 2A is a block diagram of an example structure of a partial discrete Fourier transform-spread (DFT-S) DMT system.

FIG. 2A is a block diagram of an example structure of a partial DFT-S DMT system 200, arranged in accordance with at least some embodiments described herein. The partial DFT-S DMT system 200 may include a transmitter 216 and a receiver 234. The transmitter 216 may include: the serial-to-parallel QAM module 102; the bit-loading power-scaling module 104; a partial DFT-S module 205 that includes a DFT module 202, a pre-equalizer 204, and the IDFT module 106; the parallel-to-serial module 108; the DAC 110; the E/O 111; and any other suitable components. The transmitter 216 includes components similar to those of the transmitter 116 of FIG. 1, and the description for the similar components will not be repeated here.

Similar to FIG. 1, the serial-to-parallel QAM module 102 of FIG. 2A may receive data 102a (e.g., a stream of serial data bits such as 110101 . . . ) from a data source. Assume that there are a total of N orthogonal subcarriers available for data transmission, with a block of low-frequency subcarriers (e.g., M low-frequency subcarriers) and a block of high-frequency subcarriers (e.g., N-M high-frequency subcarriers). Each high-frequency subcarrier may have a frequency higher than the block of low-frequency subcarriers. For example, the block of low-frequency subcarriers may occupy a low-frequency bandwidth where a magnitude of a channel transfer function may be relatively flat, and the high-frequency subcarriers may occupy a high-frequency bandwidth where the magnitude of the channel transfer function varies rapidly.

The serial-to-parallel QAM module 102 may convert the stream of serial data bits into parallel streams of data bits (e.g., P parallel streams of data bits with P≤N). For each symbol transmission, corresponding data bits in each parallel stream may be converted into a corresponding QAM symbol so that a set of parallel QAM symbols may be generated for the parallel streams of data bits. The set of parallel QAM symbols may include a first subset of QAM symbols to be transmitted using the block of low-frequency subcarriers and one or more remaining QAM symbols to be transmitted using the high-frequency subcarriers.

In some embodiments, the first subset of QAM symbols that correspond to a first subset of the parallel streams of data bits may be generated using a common constellation, respectively. The serial-to-parallel QAM module 102 may output the first subset of QAM symbols to the DFT module 202 of the partial DFT-S module 205. The first subset of QAM symbols may include one or more parallel QAM symbols.

The one or more remaining QAM symbols that correspond to one or more remaining parallel streams of data bits may be generated using different constellations. For example, the bit-loading power-scaling module 104 may cooperate with the serial-to-parallel QAM module 102 to implement a loading algorithm and to use different QAM constellations to transform the one or more remaining parallel streams of data bits into different QAM symbols, respectively. The bit-loading power-scaling module 104 may output the one or more remaining QAM symbols to the IDFT module 106.

The partial DFT-S module 205 may apply a partial DFT-S technique to transform the block of low-frequency subcarriers into a single-carrier QAM signal that bears information of the first subset of QAM symbols. For example, the DFT module 202 of the partial DFT-S module 205 may perform a discrete Fourier transform on the first subset of QAM symbols to generate a DFT output. The pre-equalizer 204 may pre-equalize the DFT output to generate a pre-equalized output. The IDFT module 106 may perform an inverse discrete Fourier transform on the pre-equalized output to generate the single-carrier QAM signal. A DFT operation performed by the DFT module 202 and an IDFT operation performed by the IDFT module 106 may convert the first subset of QAM symbols into the single-carrier QAM signal. The single-carrier QAM signal may occupy an entire time duration of a single DMT symbol because a shorter DFT combined with a longer, zero-padding IDFT performs interpolation of the DFT input.

The IDFT module 106 may perform an inverse discrete Fourier transform on the one or more remaining QAM symbols to form one or more high-frequency subcarriers (e.g., N-M high-frequency subcarriers). Each high-frequency subcarrier may bear information of a corresponding QAM symbol from the one or more remaining QAM symbols.

An output of the IDFT module 106 may include a hybrid signal that includes the single-carrier QAM signal and the one or more high-frequency subcarriers. For example, the hybrid signal may include a sum of: (1) the single-carrier QAM signal that corresponds to the first subset of QAM symbols; and (2) the one or more high-frequency subcarriers that correspond to the one or more remaining QAM symbols. In some embodiments, the IDFT module 106 may receive an input that includes the pre-equalized output from the pre-equalizer 204 and the one or more remaining symbols from the bit-loading power-scaling module 104. The IDFT module 106 may perform an inverse discrete Fourier transform on its input to generate the hybrid signal. In some embodiments, the input of the IDFT module 106 may possess Hermitian symmetry with a zero mean.

The one or more high-frequency subcarriers may form a DMT signal that may have zeroed subcarriers in the low-frequency band. For example, the DMT signal may include a sum of the one or more high-frequency subcarriers. The hybrid signal may include a sum of the single-carrier QAM signal and the DMT signal. Each of the one or more high-frequency subcarriers may have a corresponding frequency higher than the block of low-frequency subcarriers. The single-carrier QAM signal may be orthogonal to each of the one or more high-frequency subcarriers. The single-carrier QAM signal may occupy a frequency bandwidth associated with the block of low-frequency subcarriers. For example, the single-carrier QAM signal may occupy the same frequency bandwidth as the block of low-frequency subcarriers.

In some embodiments, a QAM signal may be generated for the low-frequency band using pulse shaping (e.g., a finite-impulse response pulse shaping filter) rather than using the pair of DFT module 202 and the IDFT module 106 illustrated in FIG. 2A. The hybrid signal may be generated by adding the QAM signal to a DMT signal that may include high-frequency subcarriers in the high-frequency band. The DMT signal may have zeroed subcarriers in the low-frequency band. However, the hybrid signal generated using such an approach may suffer from interference between the QAM signal and the DMT signal due to unavoidable spectral leakage of the QAM signal and the DMT signal. For example, the QAM and DMT spectra may have some side lobe overlap, which may result in interference. Alternatively, the QAM signal and the DMT signal may be generated using the partial DFT-S technique described herein. The partial DFT-S technique may ensure orthogonality between the QAM signal and the DMT signal so that no interference exists between the QAM signal and the DMT signal.

The parallel-to-serial module 108 may convert an output of the IDFT module 106 (e.g., the hybrid signal) to a serial stream and may add a cyclic prefix to the serial stream to eliminate inter-symbol interference (ISI) between blocks and to convert linear convolution into circular convolution. The DAC 110 may convert a digital waveform formed by the serial stream outputted from the parallel-to-serial module 108 to an analog signal. The E/O 111 may generate a transmit laser beam 214a according to the analog signal and may emit the transmit laser beam 214a to an optical fiber channel.

The receiver 234 may include the O/E 119, the ADC 120, the serial-to-parallel module 122, the DFT module 124, the equalizer 126, an IDFT module 232, the parallel QAM-to-serial module 128, and any other suitable components. The receiver 234 includes components similar to those of the receiver 134 of FIG. 1, and the description for the similar components will not be repeated here.

The O/E 119 may receive a receive laser beam 214b from the optical fiber channel. The receive laser beam 214b may include the transmit laser beam 214a corrupted by noise and/or loss during the propagation process through the optical fiber channel. The O/E 119 may convert the receive laser beam 214b into an analog signal and may optionally amplify the analog signal. The ADC 120 may convert the analog signal to a digital signal that includes a serial bit stream. The serial-to-parallel module 122 may remove the cyclic prefix from the serial bit stream. The serial-to-parallel module 122 may split the serial bit stream into multiple parallel data streams. The DFT module 124 may perform a discrete Fourier transform (e.g., a fast Fourier transform) on the multiple parallel data streams. The equalizer 126 may equalize parallel data streams outputted from the DFT module 124. The equalizer 126 may include a zero-forcing single-tap equalizer or another suitable equalizer. The IDFT module 232 may perform an inverse discrete Fourier transform on a first subset of the parallel data streams. For example, the IDFT module 232 may perform inverse operations of the DFT module 202. The parallel QAM-to-serial module 128 may demodulate each parallel data stream using a corresponding QAM demodulation technique and may output data 112b (e.g., a stream of serial data bits such as 110101 . . . ). For example, the parallel QAM-to-serial module 128 may perform inverse operations of the serial-to-parallel QAM module 102.

The partial DFT-S technique implemented in the partial DFT-S DMT system 200 may combine the single-carrier QAM signal with the high-frequency DMT subcarriers to generate the hybrid signal. The PAPR of the hybrid signal outputted from the IDFT module 106 may be lowered compared to an output of the IDFT module 106 from the system 100 of FIG. 1, since most of the power of the hybrid signal resides in the single-carrier QAM signal. Additionally, the hybrid signal does not suffer from the same noise enhancement as an ordinary single-carrier QAM signal that transmits over the entire signal band. For example, an ordinary single-carrier QAM signal may experience significant noise enhancement at high frequencies of the signal band, since the channel transfer function may exhibit significant attenuation at high frequencies. However, the partial DFT-S technique may reduce this high-frequency noise enhancement by using bit-loaded high-frequency DMT subcarriers over the high-frequency portion of the signal band. The high-frequency subcarriers may transmit QAM data using QAM constellations smaller than a QAM constellation of the single-carrier QAM signal with signal powers smaller than the single-carrier QAM signal according to respective transmission capacities of their respective sub-channels.

In some embodiments, bit loading may not be applied to the low-frequency DFT-S block and the first subset of QAM symbols at the input of the DFT module 202 may be from the same constellation and may have the same average power. The pre-equalizer 204 may perform pre-equalization on the output of the DFT module 202. For example, the pre-equalizer 204 may multiply the spreading DFT output from the DFT module 202 with real numbers that correspond to the pre-equalization transfer function. For the single-carrier QAM transmission with a zero-forcing equalizer and white noise at the receiver, an optimal splitting of equalization between the transmitter and the receiver may include equally splitting the equalization at the transmitter and the receiver. For example, assume a channel transfer function may be represented as H(). An optimal equalization transfer function for the pre-equalizer 204 may be expressed as $$\frac{1}{\sqrt{H(f)}}.$$

An optimal equalization transfer function for a post-equalizer at the receiver may be expressed as $$\frac{1}{\sqrt{H(f)}}.$$

Since optical channels are relatively stationary compared to other types of channels such as wireless channels, the channel transfer function H() may be measured and the coefficients for the pre-equalizer 204 may be appropriately configured based on the measured channel transfer function.

An optimal pre-equalizer (e.g., the pre-equalizer 204) for a DFT-S block may be obtained as described herein. Consider a DFT-S block of length M. The output X[k] of the spreading DFT from the DFT module 202 of FIG. 2A may be scaled by a pre-equalizer $G_T[k]$, $k \in \{1, 2, \ldots, M\}$, before being inputted into the IDFT module 106 of FIG. 2A. The average energy of the pre-equalizer output may be expressed as:

$$E\left\{\sum_{k=1}^{M}|X[k]G_T[k]|^2\right\} = \sum_{k=1}^{M}E\{|X[k]|^2\}|G_T[k]|^2, \quad (1)$$

where $E\{\cdot\}$ denotes expectation. It may be assumed without loss of generality that $E\{|X[k]|^2\}=1$ for all k, so that the energy of Equation (1) becomes:

$$\sum_{k=1}^{M}|G_T[k]|^2.$$

This average energy may be kept the same for all choices of $G_T[k]$, so that the transmitter's output power may keep the same. Without loss of generality, the following expression may be satisfied:

$$\sum_{k=1}^{M}|G_T[k]|^2 = 1. \quad (2)$$

If $G_T$ is expressed in the following form:

$$G_T[k] = \frac{H_T[k]}{\sqrt{\sum_{k=1}^{M}|H_T[k]|^2}}, \quad (3)$$

for any $H_T$, then $G_T$ may satisfy the constraint (2). From FIG. 2A, the receiver's zero-forcing equalizer 126 may have a form of:

$$G_R[k] = \frac{1}{C[k]G_T[k]}, \quad (4)$$

where C[k] represents the DFT of the equivalent discrete-time channel between the transmitter's IDFT output and the receiver's DFT input. C[k] may be measured by the receiver when the transmitter sends a known probing signal. In order to maximize SNR at the receiver equalizer output, the average noise energy may be minimized at the output of the receiver equalizer. The pre-equalized signal power may be the same, independent of the choice of $H_T$. However, the total noise at the equalizer output at the receiver side may depend on the choice of $H_T$. If the noise component of the output of the receiver DFT is D[k], then the corresponding equalizer output noise may be $D[k]G_R[k]$, which may have average energy:

$$E_N = E\left\{\sum_{k=1}^{M}|D[k]G_R[k]|^2\right\} \quad (5)$$

$$= \sum_{k=1}^{M} E\{|D[k]|^2\}|G_R[k]|^2$$

$$= \sum_{k=1}^{M} S_n[k]|G_R[k]|^2,$$

where $S_n[k]=E\{|D[k]|^2\}$ represents the noise power spectrum. Substituting (3) and (4) into (5), the average energy $E_N$ may be expressed as:

$$E_N = \sum_{k=1}^{M} \frac{S_n[k]\sum_{k'=1}^{M}|H_T[k']|^2}{|H_T[k]C[k]|^2} = \sum_{k=1}^{M} \frac{S_n[k]}{|H_T[k]C[k]|^2}\sum_{k=1}^{M}|H_T[k]|^2. \quad (6)$$

Letting $$A[k] = \frac{\sqrt{S_n[k]}}{|H_T[k]C[k]|}$$

and $B[k]=|H_T[k]|$, the average energy $E_N$ may satisfy:

$$E_N \geq \sum_{k=1}^{M} \frac{\sqrt{S_n[k]}}{|C[k]|}, \quad (7)$$

based on the Cauchy-Schwartz inequality $\langle A, A\rangle\langle B,B\rangle \geq |\langle A,B\rangle|^2$. The right side of (7) is independent of $H_T$. If the left side and the right side of (7) are equal for some $H_T$, then that particular $H_T$ minimizes $E_N$ and thus maximizes the received SNR for the DFT-S block. Equality occurs when A[k] and B[k] are linearly dependent:

$$|H_T[k]| = \alpha \frac{\sqrt{S_n[k]}}{|H_T[k]C[k]|}, \quad (8)$$

or $$|H_T[k]| = \alpha' \frac{S_n^{1/4}[k]}{\sqrt{|C[k]|}},$$

for any constants $\alpha$ and $\alpha'$. For the case of white noise, $S_n[k]$ is constant and $$|H_T[k]| = \frac{1}{\sqrt{|C[k]|}}$$

is optimal.

Figure 2B:
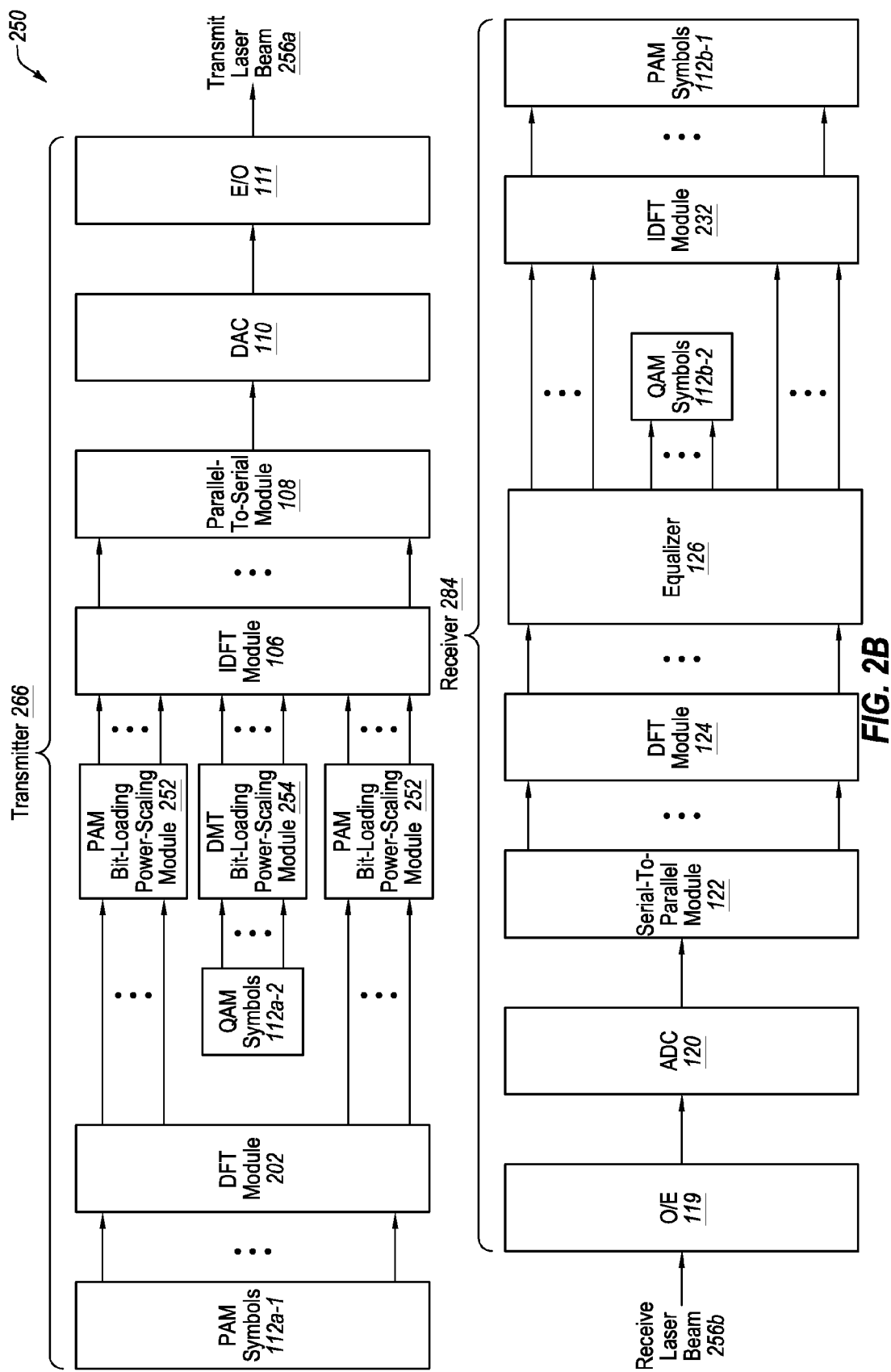
FIG. 2B is a block diagram of an example structure of an orthogonal pulse amplitude modulation-discrete multitone modulation (O-PAM-DMT) system.

Embodiments described herein may be extended to synthesize a PAM baseband signal rather than a QAM signal in an O-PAM-DMT system. FIG. 2B is a block diagram of an example structure of an O-PAM-DMT system 250, arranged in accordance with at least some embodiments described herein. The O-PAM-DMT system 250 may include a transmitter 266 and a receiver 284. The transmitter 266 may include: the DFT module 202; a PAM bit-loading power-scaling module 252; a DMT bit-loading power-scaling module 254; the IDFT module 106; the parallel-to-serial module 108; the DAC 110; the E/O 111; and any other suitable components. The transmitter 266 includes components similar to those of the transmitter 116 and/or 216 of FIGS. 1 and 2A, and the description for the similar components will not be repeated here.

Similar to FIG. 1, the transmitter 266 of FIG. 2B may receive data 102a including PAM symbols 112a-1 and QAM symbols 112a-2 from a data source. The PAM symbols 112a-1 may include PAM-4 symbols or PAM symbols of another suitable PAM constellation size. The QAM symbols 112a-2 may include QAM-8 and QAM-4 or QM symbols of one or more other suitable QAM constellation size. In at least one embodiment, the DFT module 202 includes an M-point fast Fourier transform (FFT) module and the IDFT module 106 includes an N-point inverse fast Fourier transform (IFFT) module. In the discussion of FIG. 2B, M is a length of a sequence of the PAM symbols 112a-1.

The mathematical details of an encoding and decoding process implemented in the O-PAM-DMT system 250 of FIG. 2B will now be explained. First, a length-M sequence of PAM-4 symbols p(n), n∈{0, 1, . . . , M−1} may be transformed by an M-point FFT (e.g., by the DFT module 202) according to the following expression:

$$P(k) = \sum_{n=0}^{M-1} p(n)e^{-i2\pi kn/M}.$$

Define M⁻ as M for even M and M−1 for odd M. Let N>M be even. Construct a length-N sequence U(k) as follows:

$$U(k) = \begin{cases} P(k) & \text{if } k = 0, 1, \ldots, M^-/2 - 1 \\ P(k)/2 & \text{if } k = M^-/2, \text{ even } M \\ P(k) & \text{if } k = M^-/2, \text{ odd } M \\ Q(k) & \text{if } k = M^-/2 + 1, M^-/2 + 2, \ldots, N/2 - 1 \\ 0 & \text{if } k = N/2 \end{cases}$$

where Q(k), for k E {M$^-$/2+1, M$^-$/2+2, ..., N/2-1} are QAM symbols. U(k) for k E {N/2+1,N/2+2, ..., N-1} may be defined by applying Hermitian symmetry U(k)=U*(N−k). The above construction of U(k) as an FFT corresponds to a real-valued time-domain sequence u(n) which consists of a trigonometrically interpolated baseband PAM signal (e.g., PAM symbols 112a-1 in FIG. 2B) summed with high-frequency QAM-modulated sub-carriers (e.g. QAM symbols 112a-2 in FIG. 2B). This can be seen as follows. First, consider the case where all Q(k)=0, which would result in u(n) being a length-N interpolation of the length-M sequence p(n). Next consider the case where Q(k) are arbitrary QAM symbols and all P(k)=0 (by making all p(n)=0). The resulting IFFT u(n) is a DMT signal with its subcarriers occupying a high-frequency band. By superposition, the general case in which p(n), for n∈{0, 1, ..., M−1}, are arbitrary PAM symbols and Q(k), for k ∈{M-/2+1, M-/2+2, ..., N/2−1}, are arbitrary QAM symbols yields an IFFT u(n) which is a sum of a PAM sub-signal and a DMT sub-signal.

By the above construction, the PAM sub-signal and DMT sub-signal are orthogonal within the FFT block and can be separated without crosstalk. However, when these two sub-signals are observed as contiguous signals extending beyond the duration of a single FFT block, as would be seen on any physical measurement instrument, they are spectrally overlapping. The PAM and DMT sub-signals are thus generated without any guard band between them. This is in contrast to a direct approach in which a Nyquist PAM signal is added to a DMT signal, with a guard band to prevent crosstalk.

The complex sequence U(k) is then scaled (e.g., by the PAM bit-loading power-scaling module 252 and the DMT bit-loading power-scaling module 254) by real constants to produce the effect of frequency-domain pre-equalization. For the PAM component, k∈{0, 1, ..., M-/2}, the optimal pre-equalization coefficients are given by equation 8 above. The values of $S_n(k)$ and C(k) may be estimated during training, as in DMT. For the QAM symbols Q(k), the pre-equalizer coefficients may be calculated by a discrete bit-loading algorithm, as in DMT, as implemented by the DMT bit-loading power-scaling module 254. Since there is a known relation between BER and SNR for PAM, the bit-loading algorithm, as implemented by the PAM bit-loading power-scaling module 252, can calculate the power allocated to the PAM component as if it were a single sub-carrier; this thus determines the value of α or α' in equation 8.

After pre-equalization, the N-point IFFT (e.g., the IDFT module 106) may generate a time-domain sequence which is prepadded with a cyclic prefix, as in ordinary DMT. The parallel-to-serial module 108 may convert an output of the IDFT module 106 to a serial stream and may add the cyclic prefix to the serial stream to eliminate ISI between blocks and to convert linear convolution into circular convolution. The DAC 110 may convert a digital waveform formed by the serial stream outputted from the parallel-to-serial module 108 to an analog signal. The E/O 111 may generate a transmit laser beam 256a according to the analog signal and may emit the transmit laser beam 256a to an optical fiber channel.

The receiver 284 generally performs inverse operations (compared to the transmitter 266) and may include the O/E 119, the ADC 120, the serial-to-parallel module 122, the DFT module 124, the equalizer 126, the IDFT module 232, and any other suitable components. The receiver 284 includes components similar to those of the receiver 134 and 234 of FIGS. 1 and 2A, and the description for the similar components will not be repeated here.

The O/E 119 may receive a receive laser beam 256b from the optical fiber channel. The receive laser beam 256b may include the transmit laser beam 256a corrupted by noise and/or loss during the propagation process through the optical fiber channel. The O/E 119 may convert the receive laser beam 256b into an analog signal and may optionally amplify the analog signal. The ADC 120 may convert the analog signal to a digital signal that includes a serial bit stream. The serial-to-parallel module 122 may remove the cyclic prefix from the serial bit stream. The serial-to-parallel module 122 may split the serial bit stream into multiple parallel data streams. The DFT module 124 may perform a discrete Fourier transform (e.g., a fast Fourier transform) on the multiple parallel data streams. The equalizer 126 may equalize parallel data streams outputted from the DFT module 124. The equalizer 126 may include a zero-forcing single-tap equalizer or another suitable equalizer.

The IDFT module 232 may perform an inverse discrete Fourier transform on a first subset of the parallel data streams output by the equalizer 126. For example, the IDFT module 232 may perform inverse operations of the DFT module 202 on the first subset of the parallel data streams to output PAM symbols 112b-1 that correspond to the PAM symbols 112a-1 received as input by the transmitter 266. A second subset of the parallel data streams output by the equalizer 126 may be output as QAM symbols 112b-2 that correspond to the QAM symbols 112a-2 received as input by the transmitter 266.

In the O-PAM-DMT system 250 of FIG. 2B, the total computational complexity may exceed that of a DMT system (e.g., FIG. 1) by an M-point FFT and IFFT (e.g., DFT module 202 and IDFT module 232). However, the PAPR of the resulting signal may be closer to that of Nyquist PAM, provided that most of the signal power resides in the PAM component. The spectral efficiency of the PAM component may be similar to that of Nyquist PAM. Thus, with a 32-GHz signal band provided by a 64 giga-samples per second (GS/s) DAC, 112 Gb/s may be feasible.

Since O-PAM-DMT uses frequency-domain equalization as in ordinary DMT, it may similarly implement a known training sequence to be sent during synchronization of the transmitter 266 and the receiver 284. The training signal may be generated by setting the input to the transmitter IFFT (e.g., the DFT module 202) to a known QAM sequence. The output of the IFFT (e.g., the DFT module 202) may thus be a conventional DMT signal. As in ordinary DMT, the training sequence may be sent periodically to accommodate changes in the channel. For short-reach systems based on intensity modulation, the channel may be fairly static, so the training signal may be sent infrequently enough that it imposes a negligible overhead.

A difference between O-PAM-DMT and partial-DFT-S DMT is that the PAM sub-signal may be at baseband and may possess energy near DC. If a block of PAM symbols is considered, an average over this block is unlikely to be zero. This means that the FFT of this block will most likely have a non-zero DC coefficient. This DC coefficient changes from block to block and is thus not truly at DC—it is only DC within a single O-PAM-DMT block and forms an AC signal when considering the entire O-PAM-DMT signal. However, it may still be referred to as the "DC coefficient" since it resides at a k=0 position of the FFT. This non-zero DC coefficient must be equalized at the receiver 284, unlike in partial-DFT-S DMT or ordinary DMT, where the DC coefficient is always zero. The determination of the equalizer coefficient for DC may be achieved by requiring the training signal to have a non-zero mean in each block. In other words, the training sequence may include a known amplitude modulation in the DC coefficient. The receiver 284 may then compare the received DC coefficients with the known sequence of DC coefficients to determine the DC equalizer coefficient. For cases where the FFT size is large, the DC equalizer coefficient may be approximately equal to the lowest AC coefficient.

Compared to ordinary DMT, the computational complexity of O-PAM-DMT may be greater by an additional M-point FFT and IFFT. O-PAM-DMT may be simpler in that it may require fewer and smaller constellation mappers and inverse mappers. The exact complexity of the M-point FFT/IFFT may depend on the particular value of M, with values of M having a highly composite factorization resulting in the most efficient implementation. M may thus be chosen by examining all values of M which yield approximately the desired PAM bandwidth and selecting the one with the most favorable factorization. For example, if M is desired to be within the vicinity of 200, $M=192=2^6 \cdot 0.3$ may be chosen to yield an efficient FFT implementation.

Figure 3:
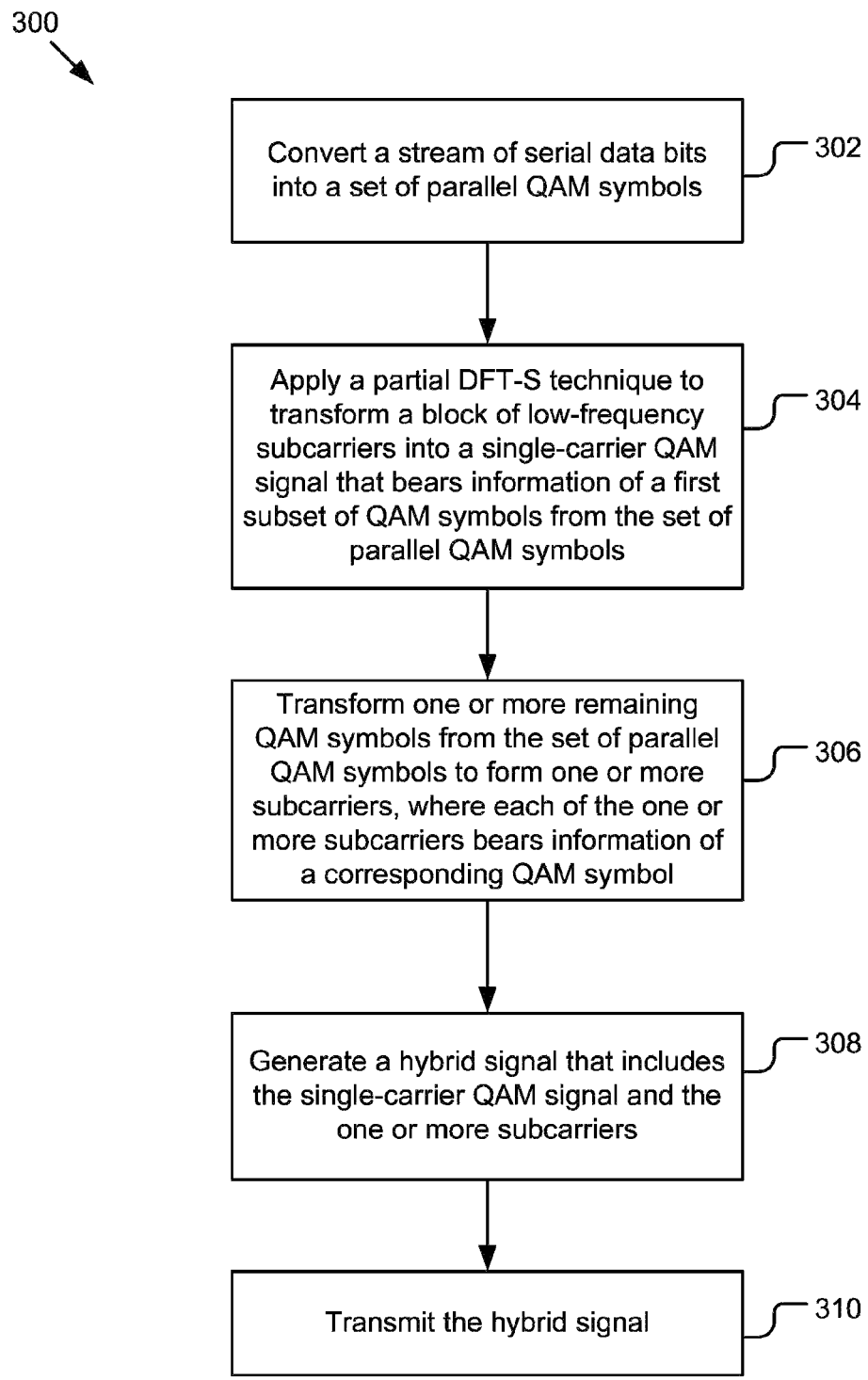
FIG. 3 shows an example flow diagram of a method of transmitting data in a partial DFT-S DMT system.

FIG. 3 shows an example flow diagram of a method of transmitting data in a partial DFT-S DMT system, arranged in accordance with at least some embodiments described herein. The method 300 may be performed in whole or in part by a transmitter (e.g., the transmitter 216 of FIG. 2A). Although illustrated as discrete blocks, various blocks may be divided into additional blocks, combined into fewer blocks, or eliminated, depending on the desired implementation.

The method 300 may begin at block 302 in which a stream of serial data bits may be converted into a set of parallel QAM symbols. For example, the stream of serial data bits may be converted into parallel streams of data bits, and data bits in each parallel stream may be converted to corresponding QAM symbols based on a QAM constellation that associates with the corresponding parallel stream.

At block 304, a partial DFT-S technique may be applied to transform a block of low-frequency subcarriers into a single-carrier QAM signal. The single-carrier QAM signal may bear information of a first subset of QAM symbols from the set of parallel QAM symbols. For example, a discrete Fourier transform may be performed on the first subset of QAM symbols to generate a DFT output. The DFT output may be pre-equalized to generate a pre-equalized output. An inverse discrete Fourier transform may be performed on the pre-equalized output to generate the single-carrier QAM signal. The first subset of QAM symbols may include one or more parallel QAM symbols.

At block 306, one or more remaining QAM symbols from the set of parallel QAM symbols may be transformed to form one or more subcarriers. Each of the one or more subcarriers may bear information of a corresponding QAM symbol from the one or more remaining QAM symbols. For example, an inverse discrete Fourier transform may be performed on the one or more remaining QAM symbols to generate the one or more subcarriers.

At block 308, a hybrid signal may be generated. The hybrid signal may include the single-carrier QAM signal and the one or more subcarriers. For example, the hybrid signal may include a sum of the single-carrier QAM signal and the one or more subcarriers. The single carrier QAM signal may be orthogonal to the one or more subcarriers.

At block 310, the hybrid signal may be transmitted to a receiver. For example, the hybrid signal may be converted to a stream of serial data. A cyclic prefix may be added to the stream of serial data, and the stream of serial data may be converted to an analog signal. The analog signal may be used to generate a transmit laser beam for transmission through an optical channel.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Some embodiments disclosed herein include an article of manufacture such as a non-transitory computer storage medium having instructions stored thereon that are executable by a computing device to perform or control performance of operations included in the method 300 of FIG. 3, such as the operations illustrated by blocks 302, 304, 306, 308, and/or 310 in FIG. 3, and/or variations thereof. The non-transitory computer storage medium may be included in or may be accessible to a computing device such as the computing device 600 of FIG. 6 or a DSP unit that includes a processor and a memory.

Figure 4:
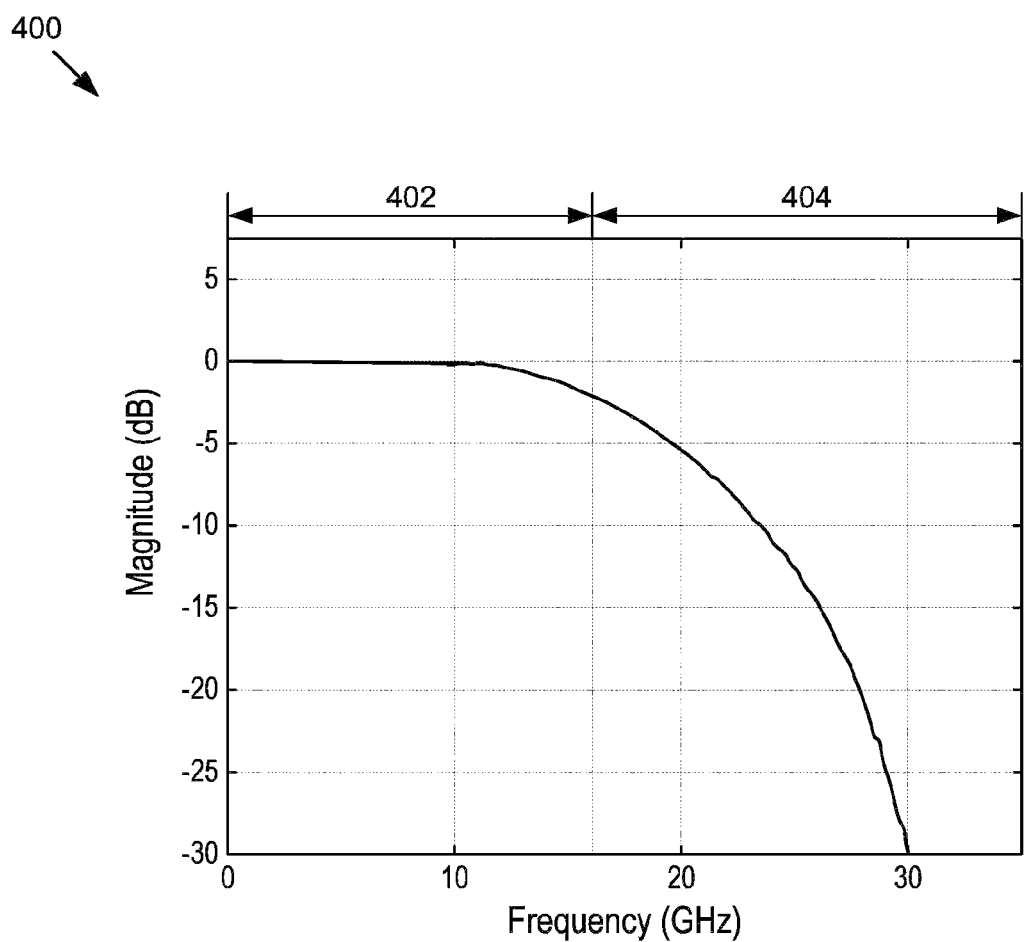
FIG. 4 is a graphic representation that illustrates a magnitude of an example channel transfer function.

FIG. 4 is a graphic representation 400 that illustrates a magnitude of an example channel transfer function, arranged in accordance with at least some embodiments described herein. The channel transfer function may include a low-frequency band 402 and a high-frequency band 404. The low-frequency band 402 may be used to transmit a single-carrier QAM signal generated by the partial DFT-S module 205. The remaining high-frequency band 404 may be used to transmit DMT subcarriers with variable bit and power allocations.

Figure 5:
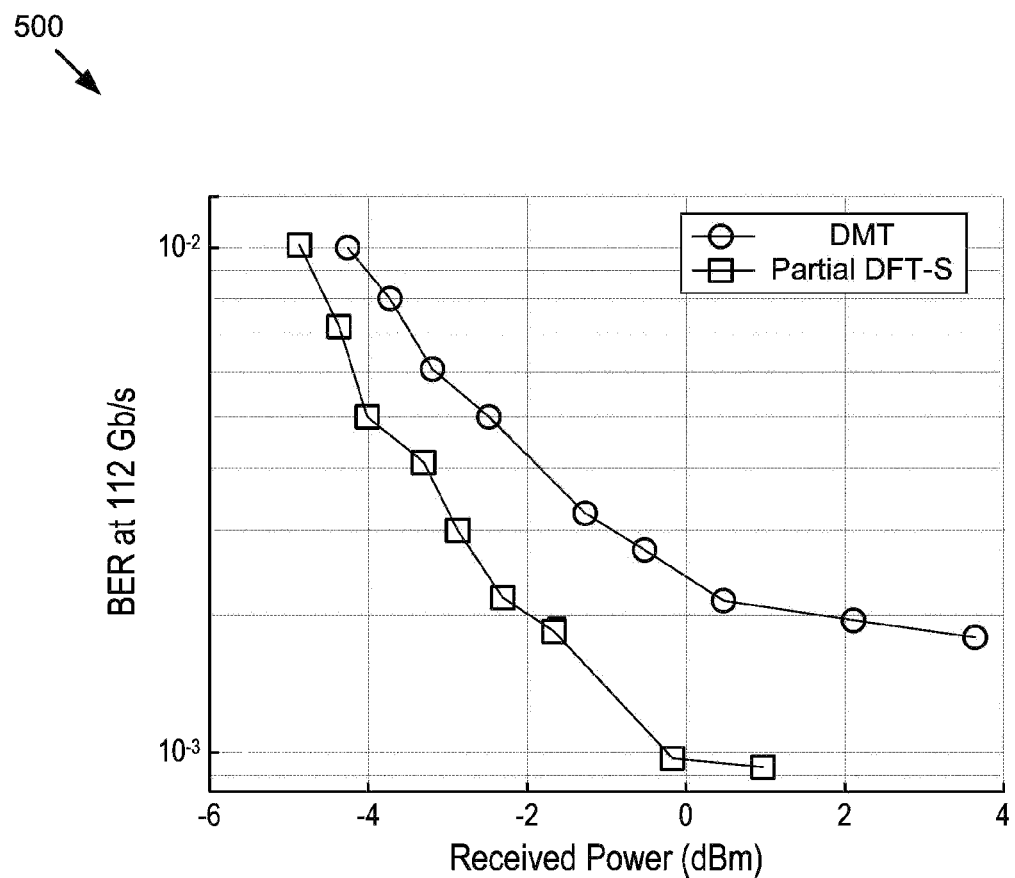
FIG. 5 is a graphic representation that illustrates simulated bit error rates as a function of received power for an example DFT-S DMT system and an example DMT system.

FIG. 5 is a graphic representation 500 that illustrates simulated BERs as a function of received power for an example partial DFT-S DMT system and an example DMT system, arranged in accordance with at least some embodiments described herein. In a simulation for a DMT system, a transmitter (e.g., the transmitter 116) may generate a 256-subcarrier DMT signal. A DAC (e.g., the DAC 110) and an ADC (e.g., the ADC 120) may operate at 56 giga-samples per second (GS/s) with 6 bits of resolution. The DAC at the transmitter may be modeled as a zero-order hold followed by a 20 GHz Bessel filter and the receiver transfer function may be modeled as a 20 GHz Bessel function.

In a simulation of the partial DFT-S DMT system, a block of 170 low-frequency subchannels of the available 255 subchannels may be combined into a single-carrier 32-QAM channel. The block of 170 low-frequency subchannels may correspond to a relatively flat region of the channel compared to the remaining subchannels. The remaining subchannels may be used to transmit DMT subcarriers with variable bit and power allocations.

Simulation results of the partial DFT-S DMT system and the DMT system are illustrated in FIG. 5 with a data rate of 112 Gb/s. The simulation results indicate that the partial DFT-S DMT system is capable of achieving a data rate of 112 Gb/s with a target BER of $10^{-3}$ at RIN of −145 dB/Hz while the DMT system may not be able to achieve a BER below $1.9 \times 10^{-3}$. The data rate of 112 Gb/s may include a useful data rate of 100 Gb/s plus an FEC overhead of 12 Gb/s.

FIG. 6 is a block diagram illustrating an example computing device 600 that is arranged for implementing digital signal processing in a DMT system and/or a partial DFT-S DMT system, arranged in accordance with at least some embodiments described herein. In a very basic configuration 602, the computing device 600 may typically include one or more processors 604 and a system memory 606. A memory bus 608 may be used for communicating between the processor 604 and the system memory 606.

Depending on the desired configuration, the processor 604 may be of any type including, but not limited to, a CPU, a μP, a μC, a DSP, or any combination thereof. The processor 604 may include one or more levels of caching, such as a level one cache 610 and a level two cache 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory), or any combination thereof. The system memory 606 may include an operating system (OS) 620, one or more applications 622, and program data 624. The application 622 may include digital signal processing (DSP) algorithms 626, or other application that may be arranged to perform one or more of the functions as described herein including those described with respect to the method 300 of FIG. 3. The program data 624 may include DSP data 628 that may be pulled into the application 622 for analysis. In some embodiments, the application 622 may be arranged to operate with the program data 624 on the OS 620 such that implementations of methods for transmitting data such as the method 300 of FIG. 3, may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device) or other peripheral devices (e.g., printer, scanner) via one or more I/O ports 658. The example communication device 646 may include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    converting a first stream of serial data bits into a set of parallel quadrature amplitude modulation (QAM) symbols;
    applying a partial discrete Fourier transform-spread (DFT-S) technique to transform a first subset of QAM symbols from the set of parallel QAM symbols into a single carrier QAM signal;
    transforming one or more remaining QAM symbols from the set of parallel QAM symbols to form one or more high-frequency subcarrier signals, wherein each of the one or more high frequency subcarrier signals bears information of a corresponding QAM symbol from the one or more remaining QAM symbols;
    generating a hybrid signal that includes the single-carrier QAM signal and the one or more high frequency subcarrier signals; and
    transmitting the hybrid signal.

2. The method of claim 1, wherein applying the partial DFT-S technique to transform the first subset of QAM symbols into the single-carrier QAM signal comprises:
    performing a discrete Fourier transform (DFT) on the first subset of QAM symbols to generate a DFT output;
    pre-equalizing the DFT output to generate a pre-equalized output; and
    performing an inverse discrete Fourier transform on the pre-equalized output to generate the single-carrier QAM signal.

3. The method of claim 2, wherein pre-equalizing the DFT output to generate the pre-equalized output comprises multiplying the DFT output with real numbers that correspond to a pre-equalization transfer function.

4. The method of claim 1, wherein transforming the one or more remaining QAM symbols to form the one or more high-frequency subcarrier signals comprises performing an inverse discrete Fourier transform on the one or more remaining QAM symbols to generate the one or more high-frequency subcarrier signals.

5. The method of claim 1, wherein transmitting the hybrid signal comprises:
    converting the hybrid signal to a second stream of serial data bits;
    adding a cyclic prefix to the second stream of serial data bits;
    converting the second stream of serial data bits to an analog signal; and
    generating, based on the analog signal, a transmit laser beam configured to transmit through an optical channel.

6. The method of claim 1, wherein:
    the first subset of QAM symbols would become low-frequency subcarrier signals absent application of the partial DFT-S technique to the first subset of QAM symbols; and
    each of the one or more high-frequency subcarrier signals has a corresponding frequency higher than a frequency of any of the low-frequency subcarrier signals.

7. The method of claim 1, wherein the single-carrier QAM signal is orthogonal to each of the one or more high-frequency subcarrier signals.

8. The method of claim 1, wherein:
    the first subset of QAM symbols would become low-frequency subcarrier signals absent application of the partial DFT-S technique to the first subset of QAM symbols; and
    the single-carrier QAM signal occupies a frequency bandwidth associated with the low-frequency subcarrier signals.

9. The method of claim 1, wherein converting the first stream of serial data bits into the set of parallel QAM symbols comprises:
    converting the first stream of serial data bits into parallel streams of data bits; and
    converting corresponding data bits in each parallel stream to a corresponding QAM symbol based on a corresponding QAM constellation.

10. The method of claim 1, wherein:
    the first subset of QAM symbols would become low-frequency subcarrier signals absent application of the partial DFT-S technique to the first subset of QAM symbols; and
    the low-frequency subcarrier signals and the one or more high frequency subcarrier signals include discrete multitone subcarrier signals.

11. A system comprising:
    a serial-to-parallel quadrature amplitude modulation (QAM) module configured to receive a first stream of serial data bits and to convert the first stream of serial data bits into a set of parallel QAM symbols; and
    a partial discrete Fourier transform-spread (DFT-S) module communicatively coupled to the serial-to-parallel QAM module, the partial DFT-S module configured to apply a partial DFT-S technique to transform a first subset of QAM symbols from the set of parallel QAM symbols into a single-carrier QAM signal, wherein:
    the partial DFT-S module includes a discrete Fourier transform (DFT) module and an inverse discrete Fourier transform (IDFT) module;
    the IDFT module is configured to transform one or more remaining QAM symbols from the set of parallel QAM symbols to form one or more high-frequency subcarrier signals, wherein each of the one or more high-frequency subcarrier signals bears information of a corresponding QAM symbol from the one or more remaining QAM symbols; and
    the IDFT module is configured to generate a hybrid signal that includes the single-carrier QAM signal and the one or more high-frequency subcarrier signals, wherein the hybrid signal is configured to transmit to a receiver.

12. The system of claim 11, wherein:
    the partial DFT-S module further includes a pre-equalizer;
    the DFT module is configured to perform a discrete Fourier transform on the first subset of QAM symbols to generate a DFT output;

the pre-equalizer is configured to pre-equalize the DFT output to generate a pre-equalized output; and the IDFT module is configured to perform an inverse discrete Fourier transform on the pre-equalized output to generate the single-carrier QAM signal.

13. The system of claim 12, wherein the pre-equalizer is configured to pre-equalize the DFT output to generate the pre-equalized output by multiplying the DFT output with real numbers that correspond to a pre-equalization transfer function.

14. The system of claim 11, wherein the IDFT module is configured to transform the one or more remaining QAM symbols to form the one or more high-frequency subcarrier signals by performing an inverse discrete Fourier transform on the one or more remaining QAM symbols to generate the one or more high-frequency subcarrier signals.

15. The system of claim 11, further comprising:
a parallel-to-serial module configured to convert the hybrid signal to a second stream of serial data bits and to add a cyclic prefix to the second stream of serial data bits; and
a digital-to-analog converter configured to convert the second stream of serial data bits to an analog signal, wherein the analog signal is used to generate a transmit laser beam configured to transmit through an optical channel.

16. The system of claim 11, wherein:
the first subset of QAM symbols would become low-frequency subcarrier signals absent application of the partial DFT-S technique to the first subset of QAM symbols; and
each of the one or more high-frequency subcarrier signals has a corresponding frequency higher than a frequency of any of the low-frequency subcarrier signals.

17. The system of claim 11, wherein the single-carrier QAM signal is orthogonal to each of the one or more high-frequency subcarrier signals.

18. The system of claim 11, wherein:
the first subset of QAM symbols would become low-frequency subcarrier signals absent application of the partial DFT-S technique to the first subset of QAM symbols; and
the single-carrier QAM signal occupies a frequency bandwidth associated with the low-frequency subcarrier signals.

19. The system of claim 11, wherein the serial-to-parallel QAM module is configured to convert the first stream of serial data bits into the set of parallel QAM symbols by:
converting the first stream of serial data bits into parallel streams of data bits; and
converting corresponding data bits in each parallel stream to a corresponding QAM symbol based on a corresponding QAM constellation.

20. A method comprising:
receiving a first set of parallel pulse amplitude modulation (PAM) symbols or quadrature amplitude modulation (QAM) symbols to be transmitted in a low frequency band of a composite channel that includes a digital-to-analog converter (DAC), a driver amplifier, an electro-optical converter, an opto-electrical converter, and an analog-to-digital converter (ADC);
receiving a second set of parallel QAM symbols to be transmitted in a high frequency band of the composite channel;
transforming the first set of parallel PAM or QAM symbols into a single-carrier PAM or QAM signal that occupies the low frequency band, wherein the single-carrier PAM or QAM signal bears information of the first set of parallel PAM or QAM symbols;
transforming the second set of parallel QAM symbols into a discrete multitone (DMT) signal that occupies the high frequency band, wherein the DMT signal bears information of the second set of parallel QAM symbols;
generating a hybrid signal that includes the single-carrier PAM or QAM signal and the DMT signal; and
transmitting the hybrid signal.

21. The method of claim 20, wherein:
the first set of parallel PAM or QAM symbols comprises parallel PAM symbols;
the single-carrier PAM or QAM signal comprises the single-carrier PAM signal;
transforming the first set of parallel PAM symbols into the single-carrier PAM signal comprises:
performing a fast Fourier transform (FFT) on the first set of parallel PAM symbols to generate an FFT output;
pre-equalizing and power-scaling the FFT output to generate a pre-equalized output; and
performing an inverse FFT (IFFT) on the pre-equalized and power-scaled output to generate the single-carrier PAM signal; and
transforming the second set of parallel QAM symbols into the DMT signal comprises performing an IFFT on the second set of parallel QAM symbols to generate one or more subcarrier signals that make up the DMT signal.

22. The method of claim 21, wherein the single-carrier PAM signal is orthogonal to each of the one or more subcarrier signals.

23. The method of claim 21, wherein the low frequency band and the high frequency band of the composite channel partially overlap.

* * * * *